Sept. 17, 1968                J. D. FANN                3,401,802
                             FILTER PRESS
                      Original Filed Feb. 1, 1965

James D. Fann
INVENTOR.

BY Carl B. Fox, Jr.
                    ATTORNEY

З,401,802
Patented Sept. 17, 1968

3,401,802
FILTER PRESS
James D. Fann, 3202 Argonne,
Houston, Tex. 77006
Original application Feb. 1, 1965, Ser. No. 429,397, now Patent No. 3,371,786, dated Mar. 5, 1968. Divided and this application Aug. 8, 1967, Ser. No. 659,066
2 Claims. (Cl. 210—446)

ABSTRACT OF THE DISCLOSURE

A filter press apparatus of the type wherein filter media is held in position over an end of a filter chamber and liquid within the filter chamber is filtered outwardly from the filter chamber through the filter media, the apparatus including seal means at the filter media and receiver means for the filtrate.

---

This application is a division of application Ser. No. 429,397, filed Feb. 1, 1965, by James D. Fann and entitled, "Filter Press," now Patent No. 3,371,786.

This invention relates to filtering apparatus and more particularly to improved filter apparatus for removing solids from a liquid under pressure.

Various liquids containing suspended solids, such as drill muds used in oil and gas well boreholes, are tested by filtration to predict their behavior characteristics under operating conditions. In the testing of drill muds, for example, filtration is preferably conducted under differential pressure conditions to simulate as closely as possible pressure conditions in a borehole where the fluid may be used. One method employed to remove solids from a liquid under differential pressure conditions involves placing a test specimen of the liquid in a container which is provided with a filter medium. The filter medium communicates with a filtrate line through which a liquid after removal of solids may be discharged from the container. A pressure source is connected through an adjustable constant pressure discharge regulator to the container for generating a head pressure on the liquid, a head pressure being a pressure which tends to force the liquid containing suspended solids through the filter medium. A second pressure source is connected through a second adjustable constant pressure discharge regulator to the filtrate discharge line for creating a back pressure on the liquid, a back pressure being one which tends to oppose movement of the liquid through the filter medium. Frequently, however, in the testing of a liquid containing suspended solids, a back pressure will be applied to the liquid which is greater than the head pressure due to maladjustment of the back pressure regulator, causing the liquid to be discharged out of the container into the head pressure regulator. Discharge of liquid into a head pressure regulator can both render the regulator inoperable and cause data from tests being run to be inaccurate.

Additionally, receptacles for receiving filtrate from the container are generally subject to the back pressure of the apparatus and glass or plastic level gauges generally employed with these receptacles can be shattered due to maladjustments of the back pressure resulting in injuries to operating personnel.

Typical prior art apparatus for testing of various materials are illustrated by the following United States Letters Patent:

F. B. Lomax, Patent No. 2,089,702, issued Aug. 10, 1937;
E. M. Brunner et al., Patent No. 2,437,935, issued Mar. 16, 1948;
P. O. Boucher et al., Patent No. 2,599,742, issued June 10, 1952;
M. B. Standing et al., Patent No. 2,646,678, issued June 28, 1953;
H. L. Twining, Patent No. 2,733,959, issued Feb. 7, 1956;
K. T. Norell, Patent No. 2,909,286, issued Oct. 20, 1959;
J. P. Gallus, Patent No. 3,055,208, issued Sept. 25, 1962;
H. H. Farrell et al., Patent No. 3,139,747, issued July 7, 1964.

As illustrated by the Standing et al. patent mentioned above, prior art devices employing a removable filter medium retainer adjacent the bottom of the liquid container have not provided adequate sealing means to prevent leakage of liquid out of the container into the atmosphere.

Another disadvantage of prior art systems is their inability to automatically maintain a constant back pressure. Generally, filtrate collects in the back pressure system causing the back pressure to increase due to presence of the extra fluid. The excess pressure generated is usually relieved manually which requires that an operator be present at all times during the test to relieve the excess back pressure as it builds up.

Accordingly, it is an object of this invention to provide an apparatus for filtering of liquid containing suspended solids which eliminates the possibility of back pressure on the liquid exceeding the head pressure.

Yet another object is to provide an improved means for sealing the filtering medium in the liquid container.

Still another object is to provide apparatus capable of automatically relieving excess back pressure.

The invention may be described generally as an apparatus for removing solids from a liquid under differential pressure, which apparatus includes container means for containing the liquid under pressure, means for filtering solids from the liquid and means for introducing compressed gas into the container means for generating a head pressure on the liquid, which apparatus additionally includes the improvement comprising: first means serving to communicate gas generating head pressure on the liquid with the filtration means for generating a back pressure on the liquid; and second means associated with the first means for maintaining a lower back pressure than head pressure on the liquid.

To be more specific, reference is now made to the drawings.

In the drawings:
FIGURE 1 is a schematic illustration of one embodiment of the invention,
FIGURE 2 is a partial cutaway cross-sectional view of the liquid container of FIG. 1 illustrating the filter medium retaining means,
FIGURE 3 is an enlarged partial cutaway cross-sectional view of the needle valve illustrated in FIG. 2.

Referring now particularly to FIGS. 1 and 2, cylindrical container means 1 is provided for containing a fluid, such as a drill mud or the like, which has suspended solids. Container 1 is preferably formed of a metal, such as stainless steel, which is capable of withstanding pressures on the order of 1000 pounds per square inch. Container 1 is provided proximate its lower end with an annular recess 2 which terminates at annular shoulder 3. Recess 2 is adapted to receive cup member 4 which has a circular peripheral configuration. Cup member 4 is provided with a circular lip 5 which defines a recess adapted to receive a filter medium 6 which is comprised of filter paper 7 which overlies a perforate screen material 8. Obviously, other type filter media may be utilized. Above cup 4, wall 59 of container 1 defines a chamber 9 for containing a test specimen of a liquid to be filtered.

To sealingly retain a liquid within container 1, a resilient seal means is provided such as a quad-ring 11 which, as illustrated, resembles a four-leaf clover in cross-section. An O-ring or the like may be used, but a quad-ring is preferred. Quad-ring 11 overlies the periphery of filter medium 6 and engages both lip 5 and shoulder 3 which, as illustrated particularly by FIG. 2, proximately abut. To assure sealing engagement of quad-ring 11 with shoulder 3 and lip 5, cup member 4 is retained within recess 2 by means of a C-ring 12, which may be outwardly beveled as shown. C-ring 12 is accommodated in an annular groove 13 provided in wall 59 of container 1. Annular groove 13 may form a surface inclined radially outwardly toward the shoulder portion of recess 2 to permit C-ring 12 compressingly retain cup 4 in recess 2 upon insertion of C-ring 12 to compressingly retain cup 4 in recess 2 upon insertion of C-ring 12 in groove 13. C-ring 12 and groove 13 may be provided without the bevels shown in the drawing, and other retaining means may be substituted to hold cup 4 in place in recess 2.

Cup 4 is provided with a passageway 14 which communicates at its upward end with the recess formed by lip 5 and its lowermost end with an opening 15 defined by nipple 16. Threadably engaged with nipple 16 through threads 17 is a needle valve 18 provided with a conical tip 19.

The conical tip 19 upon full engagement of needle valve 18 with nipple 16 engages passageway 14 as illustrated in FIG. 3 to block fluid communication therethrough. Rotation of needle valve 18 to move valve 18 downward as viewed in FIG. 3 will permit communication between passageway 14 and passageways 21 which converge into passageway 22. To prevent the leakage of fluid contained in the chamber 15 around threads 17, an O-ring 23 is carried within groove 24 in needle valve 18 for sealingly engaging needle valve 18 with the interior wall 25 of nipple 16.

Referring back to FIG. 1, means are provided for establishing a differential pressure across fluid in container 1. These means include a pressure source such as the cartridge of pressurized gas 26 which communicates through conduit 27 with the inlet port 28 of a conventional adjustable constant pressure discharge regulator 29. Regulator 29 is adapted to reduce pressure applied to its inlet port 28 and apply the reduced pressure to its discharge port 31. Regulator 29 communicates through conduit 32 with chamber 9 of container 1 for applying a head pressure to any liquid contained therein. Conduit 32 is provided with a coupling 30 of conventional design to permit removal of regulator 29 from container 1. Discharge port 31 of regulator 29 also communicates through conduit 33, needle valve 34 and conduit 35 with the port 36 of a conventional adjustable constant pressure discharge regulator 37. Regulator 37 is provided with another port 38 which through conduit 39 communicates with a filtrate receiver 41 which is preferably formed of a metal, such as stainless steel, capable of sustaining pressures on the order of 1000 pounds per square inch (p.s.i.).

Filtrate receiver 41 is provided with conduit means 42 which communicates at its bottom end with the bottom of filtrate receiver 41 and at its uppermost end with needle valve 18 which is schematically illustrated in FIG. 1. Any suitable type of coupling 40 can be used to connect needle valve 18 and conduit 42. Needle valve 18, as explained before, communicates through cup 4 and filter medium 6 with chamber 9 of container 1. Conduit means 42 communicates through conduit 43, needle valve 44 and conduit 45 with the exterior of filtrate receiver 41. Conduit 45 conveniently terminates in a graduated cylinder 46.

To permit gauging of pressures applied through discharge port 31 of regulator 29, a conventional pressure gauge 47 is provided which communicates with discharge port 31 through a conduit 48. Similarly, pressure applied through port 38 of regulator 37 may be sensed through use of a conventional pressure gauge 49 which communicates with port 38 through conduit 51. Regulator 37 is preferably provided with conventional means for relieving pressure at its port 38 when the pressure at port 38 exceeds a predetermined pressure. Gas generating the excess pressure at port 38 is relieved to the atmosphere through a conduit 52 which terminates in a bubble trap 53 which is filled with a liquid 54 such as water and vented to the atmosphere through an opening 55.

Means are also provided for rinsing the temperature of the test specimen above atmospheric temperature. These means conveniently take the form of a conventional thermostat controlled power source 56 which drives a heating element 57 disposed about container 1. Visual perception of temperature in container 1 is permitted by use of a conventional thermometer 58 which is carried within a recess (not illustrated) within wall 59 of container 1.

In operation, container 1 is filled with a test specimen of a liquid containing suspended solids such as a drill mud by disconnecting couplings 30 and 40, removing and inverting container 1, removing beveled C-ring 12, cup 4, filter medium 6 and quad-ring 11. A cap (not illustrated) may be placed over coupling 30 to prevent flow therethrough, and then container 1 is filled with a test specimen of liquid. After filling of chamber 9 with the liquid, the quad-ring 11, filter medium 6 and cup 4 are inserted in recess 2 as illustrated in FIG. 2. C-ring 12 is then radially compressed, placed in recess 2 and permitted to expand into groove 13 as illustrated in FIG. 2 for compressingly retaining cup 4 in recess 2. Valve 18 is fully engaged to block passageway 14 and prevent loss of fluid through passageway 14 when container 1 is again inverted and placed in the position illustrated in FIG. 1. After removal of the cap (not illustrated) the couplings 30 and 40 are connected. Valves 34 and 44 are closed to prevent communication therethrough as are regulators 29 and 37. Gas cartridge 26 is then punctured, releasing gas to inlet port 28 of valve regulator 29. Regulator 29 is then adjusted to apply a relatively small head pressure to liquid in container 1, for example, 100 pounds per square inch, to assure that cup 4 has been properly inserted and no fluid leakage will occur about quad-ring 11. The temperature of the liquid is then brought to a predetermined level by operation of theremostat controlled power source 56. Regulator 29 is then adjusted to apply a predetermined head pressure on liquid in container 1, for example 1000 p.s.i. The amount of pressure being applied can of course be determined by viewing of gauge 47.

Valve 34 is then opened permitting communication of regulator 37 with the discharge port 31 of regulator 29. Regulator 37 is then adjusted to a predetermined pressure level, for example 200 p.s.i., which will be reflected by gauge 49. Valve 18 is opened permitting the pressure applied at port 38 of regulator 37 to apply a back pressure through passageway 14 on the liquid in container 1. When the desired back pressure is reached, valve 34 is closed. Since the head pressure will be greater than the applied back pressure, liquid in container 1 will flow through filter medium 6, depositing solids thereon, and the filtered liquid or filtrate will pass through passageway 14 and into filtrate receiver 41 through conduit 42. As filtrate receiver 41 begins to fill, the back pressure on the liquid in container 1 will increase above the predetermined discharge pressure of regulator 37 due to the confinement of gas creating back pressure. Regulator 37 through the relief means provided therein will relieve this excess pressure into bubble trap 53 to maintain a constant back pressure. An indication of amount of filtrate being retained in filtrate retainer 41 can be gained by observing the amount of gas flow through bubble trap 53.

When a desired filtration period has elapsed, valve 18 is closed and valve 44 opened to permit pressure in filtrate retainer 41 to force filtrate contained in the receiver 41 through conduit 43, valve 44 and conduit 45 into graduated cylinder 46 where the volume of filtrate can be measured.

If, at the end of a test it becomes necessary or desirable to remove regulator 29 from container 1 before cooling of the test specimen is completed, valve means (not shown) may be provided between regulator 29 and container 1 to close communication therebetween after filtration of a liquid is completed. By closing these valve means before reduction of head pressure, the pressure in container 1 can be maintained during cooling of liquid therein to prevent boiling of the liquid which may occur if head pressure is reduced before the liquid cools.

Because both the head pressure applied to the fluid in container 1 and the back pressure applied through passageway 14 are derived from the discharge port of regulator 29, the possibility of back pressure exceeding head pressure is eliminated. Thus, possibility of damage to the head pressure regulator due to discharge of liquid out of container 1 is eliminated. Additionally, only one pressure generating source is necessary to create a differential pressure across a test specimen of liquid. Because an operator can with reasonable accuracy determine amount of filtrate being collected by viewing bubble trap 53, no glass or plastic level gauges are needed and danger to operators from shattered glass or plastic is eliminated. Additionally, because the filtrate receiver can be constructed entirely of metal, the size of the container to hold a given volume of liquid can be reduced since glass ordinarily employed to contain routine pressure is of necessity quite thick.

Gas cartridge 26 which may containe carbon dioxide, nitrogen, or the like may be of any conventional type such as those manufactured by Walter Kidde Company. Regulator 29 may conveniently be a series 1100 regulator sold by Air Reduction Company, and regulator 37, including relief means, may be a type 16–003 manufactured by the C. A. Norgren Company. Pressure gauges 47 and 49 may be of any conventional type such as those solid by Air Reduction Company. While rather specific terms have been used to describe one embodiment of the invention, they are not intended nor should they be construed to limit the scope of the invention as defined by the appended claims.

What is claimed is:

1. In filtration apparatus for removing solids from a suspension thereof in liquid under pressure of the type including a container for containing the suspension under pressure, the improvement comprising:

a container having an open end which is provided with an annular recess that terminates in an outwardly facing shoulder;

a cup member which conforms in peripheral configuration to said container recess for insertion therein;

the cup member having a lip which proximately abuts said shoulder upon insertion of the cup member into said container recess, said cup member lip also defining a cup recess adapted to receive a filter medium across the bottom thereof;

a filter medium within said cup recess;

resilient seal means disposed to overlie said filter medium about its periphery adjacent said lip and extending beyond said lip for securing said filter medium in said cup recess and sealingly engaging both said lip and said shoulder;

and means for retaining said cup member in said container recess with said seal means comprising an annular groove around said recess and ring means inserted into said annular groove to bear inwardly against said cup member.

2. The apparatus of claim 1 wherein said ring means and annular groove include cooperating bevel surfaces whereby said ring means retains said cup member compressively in said container recess.

References Cited
UNITED STATES PATENTS

| | | | |
|---|---|---|---|
| 2,784,843 | 3/1957 | Braunlich | 210—446 X |
| 3,160,000 | 12/1964 | Mosher | 210—446 X |
| 3,250,395 | 5/1966 | Blume | 210—451 X |

SAMIH N. ZAHARNA, *Primary Examiner.*